US009825578B2

(12) United States Patent
Sugahara

(10) Patent No.: US 9,825,578 B2
(45) Date of Patent: Nov. 21, 2017

(54) CONTROL DEVICE

(71) Applicant: Mitsubishi Electric Corporation, Chiyoda-ku, Tokyo (JP)

(72) Inventor: Tetsuo Sugahara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/112,573

(22) PCT Filed: Feb. 17, 2014

(86) PCT No.: PCT/JP2014/053660
§ 371 (c)(1),
(2) Date: Jul. 19, 2016

(87) PCT Pub. No.: WO2015/122019
PCT Pub. Date: Aug. 20, 2015

(65) Prior Publication Data
US 2016/0380576 A1    Dec. 29, 2016

(51) Int. Cl.
H02P 25/00    (2006.01)
H02P 29/60    (2016.01)
H02P 27/06    (2006.01)

(52) U.S. Cl.
CPC .............. *H02P 29/60* (2016.02); *H02P 27/06* (2013.01)

(58) Field of Classification Search
CPC .............. H02P 6/12; H02P 27/06; G01K 7/00
(Continued)

(56) References Cited

U.S. PATENT DOCUMENTS 4,450,398 A * 5/1984 Bose .................. H02P 23/0077
                                                    318/803
4,481,457 A * 11/1984 Zach ...................... G05B 13/04
                                                    318/803
(Continued)

FOREIGN PATENT DOCUMENTS

JP          3-128692 A       5/1991
JP          10-336805 A     12/1998
(Continued)

OTHER PUBLICATIONS

*International Search Report (PCT/ISA/210) dated May 13, 2014, by the Japanese Patent Office as the International Searching Authority for International Application No. PCT/JP2014/053660.
(Continued)

*Primary Examiner* — Jorge L Carrasquillo
(74) *Attorney, Agent, or Firm* — Buchanan Ingersoll & Rooney PC

(57) ABSTRACT

Object of the present disclosure is to improve accuracy of over-temperature protection of an electric motor. A control device controls an inverter main circuit for driving the electric motor. An electric power conversion circuit controller acquires DC voltage input to the inverter main circuit, output voltage of the inverter main circuit, motor amperage of current flowing through the electric motor, and motor frequencies indicating rotation rate of the electric motor. Based on at least one of the DC voltage, output voltage, motor amperage and motor frequencies, a motor loss estimator calculates a stator loss and rotor loss, each including fundamental and harmonic losses of the electric motor. Based on the inverter output voltage, stator loss and rotor loss, the electric power conversion circuit controller outputs an actual control value for control of the inverter main circuit.

5 Claims, 8 Drawing Sheets

(58) Field of Classification Search
USPC ............. 318/798, 629, 400.17, 400.503, 801
See application file for complete search history.

(56) References Cited

U.S. PATENT DOCUMENTS

| | | | | |
|---|---|---|---|---|
| 5,057,760 A | * | 10/1991 | Dadpey | ................... B60L 7/003 318/807 |
| 2013/0028292 A1 | * | 1/2013 | Senoo | .................... G01K 13/00 374/183 |
| 2014/0252910 A1 | * | 9/2014 | Kunihiro | .............. H02K 17/165 310/211 |

FOREIGN PATENT DOCUMENTS

| | | | | |
|---|---|---|---|---|
| JP | 11-289790 A | | 10/1999 | |
| JP | 2001-268989 A | | 9/2001 | |
| JP | 2006-50746 A | | 2/2006 | |
| JP | 2006050746 A | * | 2/2006 | |
| JP | 2007-104778 A | | 4/2007 | |
| JP | 2007-315994 A | | 12/2007 | |
| JP | 2013-29483 A | | 2/2013 | |
| JP | 2013029483 A | * | 2/2013 | ............. G01K 13/00 |
| JP | 2013-55792 A | | 3/2013 | |

OTHER PUBLICATIONS

*Written Opinion (PCT/ISA/237) dated May 13, 2014, by the Japanese Patent Office as the International Searching Authority for International Application No. PCT/JP2014/053660.

* cited by examiner

CONTROL DEVICE

TECHNICAL FIELD

The present disclosure relates to a control device for driving an electric motor.

BACKGROUND ART

A control device of an induction electric motor that is the power source of an electric vehicle converts a run command, ordering output from the induction electric motor, into a control signal that is output to an inverter main circuit. The inverter main circuit converts inputted DC electric power into variable voltage-variable frequency AC electric power and drives the induction electric motor.

The electric power supplied to the electric motor, in addition to being converted into shaft output of the electric motor, is converted into iron loss and copper loss, which are internal losses of the electric motor. These iron and copper losses become thermal energy and cause a rise of temperature of the electric motor.

Control devices for electric motors (also referred to below simply as "motors") often lack over-temperature protection for the motor due to omission of a temperature sensor due to difficulty of placement of the temperature sensor in the electric motors, as well as high cost and the like. When over-temperature protection is provided, protective sensing and the like occurs when the motor current effective value exceeds a threshold for at least a fixed time period, or when an estimated motor temperature or a corresponding equivalent loss exceeds a threshold value. For example, according to Patent Literature 1, a main electric motor is determined to have a temperature state exceeding a standard state based on a motor current effective value.

According to the electric motor control method of Patent Literature 2, temperature of the other windings is estimated based on temperature detected by a temperature sensor arranged at a position for detection of temperature of one winding among windings supplying three-phase AC current. Temperature is inferred from resistance value by use of the fact that resistance value of the winding is proportional to its temperature. The electric motor protective device of Patent Literature 3 uses voltage and current value of each frequency as input data for calculation of impedance, and calculates temperatures of the electric motor stator and windings of rotor based on the resistance component of impedance. According to the motor heating-protection device of Patent Literature 4, motor applied voltage, rotation rate and motor current are used to calculate winding resistance, and a winding temperature θ is calculated based on the winding resistance. Moreover, according to the temperature-change sensing method for a rotary motor of Patent Literature 5, each value of coil current, voltage across the coil terminals and rotor rotation rate is used to calculate a coil line-to-line resistance value.

CITATION LIST

Patent Literature

Patent Literature 1: Unexamined Japanese Patent Application Kokai Publication No. H10-336805
Patent Literature 2: Unexamined Japanese Patent Application Kokai Publication No. 2001-268989
Patent Literature 3: Unexamined Japanese Patent Application Kokai Publication No. H3-128692
Patent Literature 4: Unexamined Japanese Patent Application Kokai Publication No. H11-289790
Patent Literature 5: Unexamined Japanese Patent Application Kokai Publication No. 2007-315994

SUMMARY OF INVENTION

Technical Problem

In the above described manner, in the case of a motor provided with over-temperature protection, the motor is protected by stoppage of a control device and the like when the motor current effective value exceeds a threshold for at least a fixed time period and the like, or when an estimated motor temperature or a corresponding equivalent loss exceeds a threshold value. However, the motor losses, when a motor is controlled using an inverter, include losses due to fundamental waves and losses due to harmonic waves. In particular, losses due to harmonic waves are greatly affected by motor voltage, inverter output frequency, inverter carrier frequency and pulse mode. Thus calculating motor losses based only on motor current, as in Patent Literature 1, is disadvantageous in that the calculated motor loss is underestimated.

Thus due to factors such as the inability to accurately estimate motor losses in view of non-fundamental copper losses such as harmonic copper loss, iron loss, and the like in the conventional estimation of motor temperature for motor over-temperature protection, motor temperature cannot be accurately estimated. Accuracy is poor for a method that infers temperatures of other windings based on the temperature of a single winding, or that estimates temperature based on a resistance value.

In consideration of the above circumstances, the objective of the present disclosure is to improve accuracy of over-temperature protection of an electric motor.

Solution to Problem

The control device of the present disclosure is a control device to control an inverter for driving an electric motor; the control device acquires a DC voltage input to the inverter, an output voltage of the inverter, a motor amperage of current flowing through the electric motor, and a motor frequency indicating a rotation rate of the electric motor; and the control device uses a loss calculator to calculate a stator loss and a rotor loss including fundamental losses and harmonic losses of the electric motor, based on at least one of the DC voltage, the output voltage of the inverter, the motor amperage, and the motor frequencies. Also the control device is equipped with a controller to output an actual control value for control of the inverter, based on the output voltage of the inverter, the stator loss and the rotor loss. The loss calculator calculates the stator loss including a fundamental primary copper loss, a harmonic primary copper loss, a stator fundamental iron loss and a stator harmonic iron loss of the electric motor. The loss calculator also calculates the rotor loss including a fundamental secondary copper loss, a harmonic secondary copper loss and a stator harmonic iron loss of the electric motor.

Advantageous Effects of Invention

According to the present disclosure, the accuracy of over-temperature protection of an electric motor is improved by calculating a stator loss and a rotor loss including fundamental losses and harmonic losses of the electric motor, and an actual control value for controlling an inverter is output based on the output voltage of the inverter, the stator losses and the rotor losses.

DESCRIPTION OF EMBODIMENTS

Embodiment 1

Figure 1:
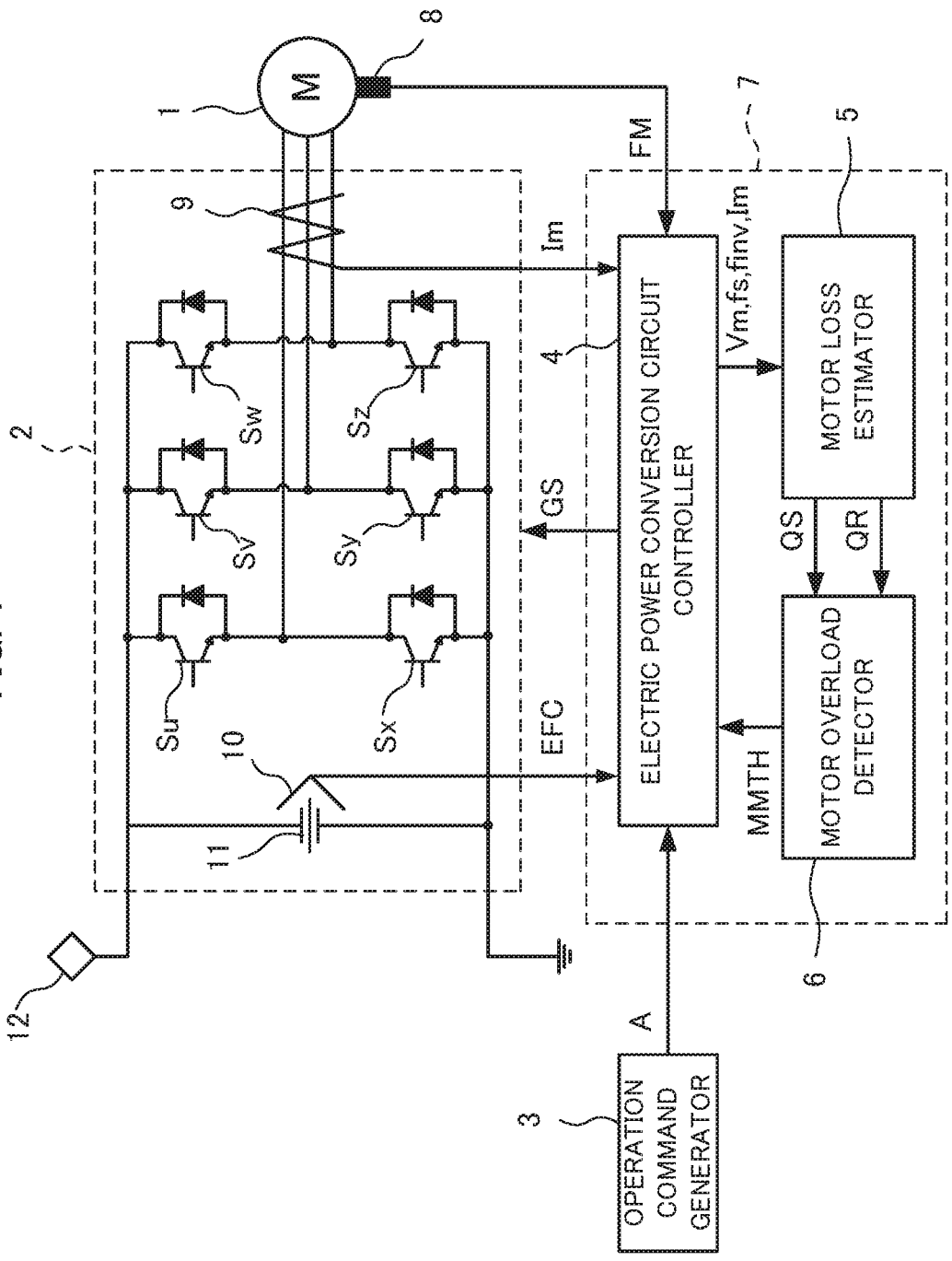
FIG. 1 is a diagram showing configuration of a control device according to Embodiment 1 of the present disclosure.

FIG. 1 is a diagram showing configuration of a control device according to Embodiment 1 of the present disclosure. In Embodiment 1, an electric motor 1 is an induction electric motor. An inverter main circuit 2 includes a filter capacitor 11 and semiconductor switching elements Su, Sx, Sv, Sy, Sw and Sz. Based on a main circuit operation command GS output from an electric power conversion circuit controller 4, the inverter main circuit 2, by ON-OFF control of the switching elements Su to Sz, converts DC electric power supplied from a pantograph 12 to variable voltage-variable frequency three-phase AC current, and supplies the three-phase AC current to the electric motor 1. The control device 7 includes the electric power conversion circuit controller 4, a motor loss estimator 5 and a motor overload detector 6. An operation command generator 3 outputs to the electric power conversion circuit controller 4 a run command A such as a command for powering or braking, and a strength thereof and the like. The run command A includes an output voltage of the inverter main circuit 2.

The reason for underestimation of losses of the electric motor when calculating the motor loss only using motor current is explained below. Motor voltage increases with the inverter frequency, and is saturated at a voltage that depends on the DC voltage input to the inverter. The magnitude of the motor current is determined by the output required for the electric motor.

For example, when the electric motor is controlled using the inverter, in the low inverter frequency region, the carrier frequency is set in a range of several hundreds of Hz to several thousands of Hz, and switching operation of the inverter main circuit is performed by triangular wave comparison out of synchrony with the modulation wave. This condition is referred to as "asynchronous mode". In the inverter frequency region up to the motor voltage saturation frequency, the carrier frequency is synchronized with the modulation wave, and the carrier frequency is set such that the pulse count during the inverter output voltage half cycle is at least 3 pulses, so as to perform switching operation of the inverter main circuit. This condition is referred to as "synchronous multi-pulse mode". In the region of motor voltage saturation, the carrier frequency and the inverter frequency are synchronized so that the motor voltage becomes maximum, the pulse count during the inverter output voltage half cycle is set to one, and switching operation of the inverter main circuit is performed. This condition is termed "synchronous one-pulse mode".

When the inverter is used to control the motor, the carrier frequency and the pulse mode are made variable according to the inverter frequency or motor voltage. Here, in synchronous multi-pulse mode, a harmonic primary copper loss and a harmonic secondary copper loss are large and lead to increased motor loss.

The expression "primary copper loss" refers to ohmic loss generated in a primary winding resistance. Among primary copper losses, the "fundamental primary copper loss" refers to the portion generated by the fundamental of the inverter frequency. The "secondary copper loss" is the ohmic loss generated in the secondary winding. Among secondary copper losses, the "harmonic secondary copper loss" refers to the portion generated by the harmonics of the inverter frequency. The "iron losses" are hysteresis loss and eddy current loss occurring mainly in the iron core. The "fundamental iron loss" refers to the portion generated by the fundamental of the inverter frequency, and the "harmonic iron loss" refers to the portion generated by the harmonics of the inverter frequency.

The motor current effective value used for temperature evaluation of the motor according to the conventional technology indicates only the fundamental primary copper loss and the fundamental secondary copper loss. By only using the motor current effective value, iron and surface losses cannot be considered, and this results in underestimation of motor losses.

Thus according to Embodiment 1, losses due to harmonic components are considered, and over-temperature is sensed based on calculation of stator loss and rotor loss of the electric motor 1. A method for sensing the degree of over-temperature of the electric motor 1 according to Embodiment 1 is described in detail below with reference to figures. Within the figures, components that are the same or equivalent are assigned the same reference sign.

A run command (output voltage of the inverter main circuit 2) A from the operation command generator 3 is received as input by the control device 7 of FIG. 1. The control device 7 acquires the DC voltage EFC and the motor current Im from the inverter main circuit 2. Moreover, the motor frequency FM is acquired from a rotation detector 8 attached to the electric motor 1. The DC voltage EFC is detected by a voltage detector 10. The motor current Im is detected by a current detector 9. Based on the DC voltage EFC, run command A, motor current Im and motor frequency FM, the control device 7 calculates the stator loss QS and rotor loss QR, each including the fundamental losses and harmonic losses of the electric motor 1. Thereafter, based on the run command A, stator loss QS and rotor loss QR, the main circuit operation command GS is output for control of the inverter main circuit 2.

Figure 2:
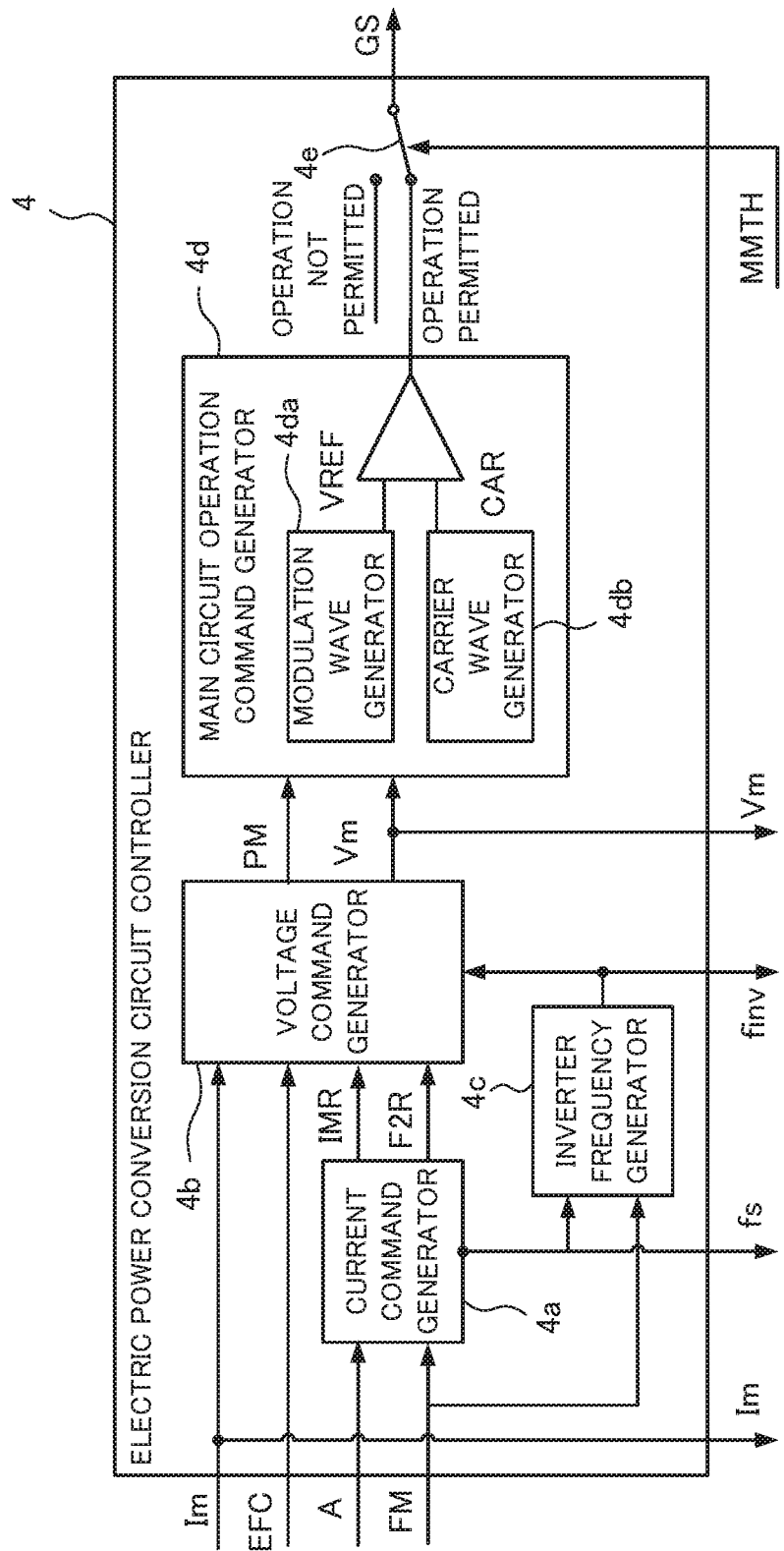
FIG. 2 is a block diagram showing an example configuration of an electric power conversion circuit controller according to Embodiment 1.

FIG. 2 is a block diagram showing an example configuration of the electric power conversion circuit controller according to Embodiment 1. Based on the run command A and the motor frequency FM of the electric motor 1, the electric power conversion circuit controller 4 calculates a slip frequency fs using the current command generator 4a and calculates the desired torque to be output by the electric motor 1. Thereafter, an electric current command IMR and a magnetic flux command F2R for the output of the inverter main circuit 2 are output to the voltage command generator 4b. Moreover, the slip frequency fs is output to an inverter frequency generator 4c.

The inverter frequency generator 4c generates as output an inverter frequency finv based on the run command A, motor frequency FM and slip frequency fs, and sends the output to the motor loss estimator 5 (FIG. 1). Moreover, the inverter frequency finv is output to the voltage command generator 4b.

The voltage command generator 4b outputs a voltage command Vm and a pulse mode PM to the main circuit operation command generator 4d based on the electric current command IMR and magnetic flux command F2R output from the current command generator 4a, the DC voltage EFC supplied from the pantograph 12, the motor current Im flowing through the electric motor 1, and the inverter frequency finv output from the inverter frequency generator 4c. In the main circuit operation command generator 4d, a modulation wave generator 4da is used to generate a modulation wave VREF, based on the voltage command Vm and the pulse mode PM, and a carrier wave generator 4db is used to generate a carrier wave CAR. Then the carrier wave CAR and the modulation wave VREF are compared, and a main circuit operation command GS is output to a switching element. However, as explained below, when a motor load MMTH is detected, a switch 4e is used to make the main circuit operation command GS inoperable and the switching element is set to the OFF state.

Figure 3A:
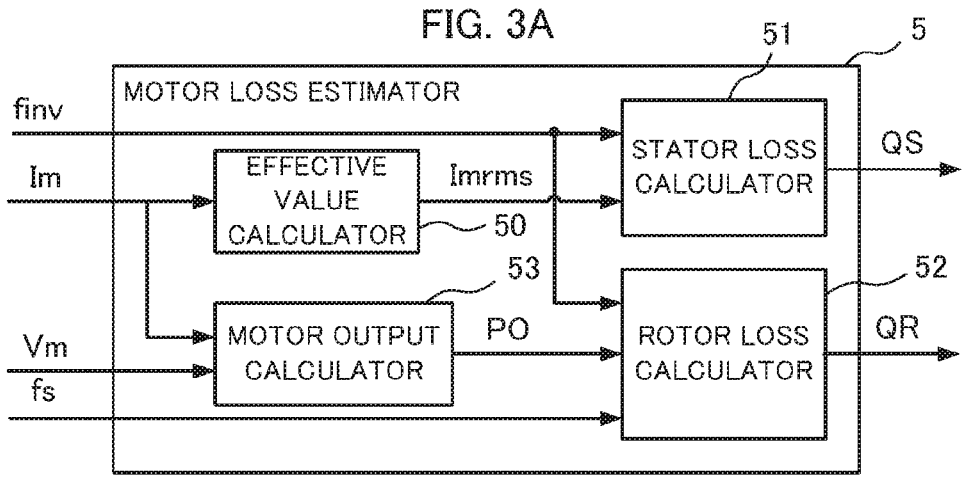
FIG. 3A is a diagram showing configuration of a motor loss estimator according to Embodiment 1.

FIG. 3A is a diagram showing configuration of a motor loss estimator according to Embodiment 1. The motor loss estimator 5, based on the motor current Im output by the electric power conversion circuit controller 4, uses an effective value calculator 50 to calculate a motor current effective value Imrms. Based on the motor current Im and the voltage command Vm output from the electric power conversion circuit controller 4, a motor output calculator 53 calculates a motor output PO. Based on the motor current effective value Imrms, the motor output PO, and the inverter frequency finv and slip frequency fs output by the electric power conversion circuit controller 4, a stator loss QS is calculated by a stator loss calculator 51 and a rotor loss QR is calculated by a rotor loss calculator 52, and these calculated values are output to a motor overload detector 6 (FIG. 1).

Figure 3B:
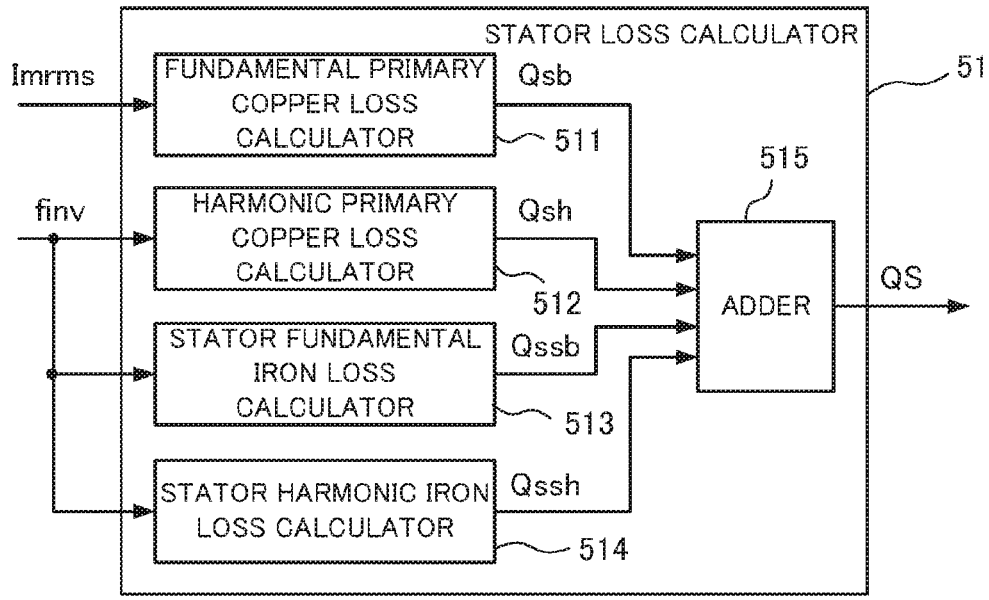
FIG. 3B is a diagram showing configuration of a stator loss calculator according to Embodiment 1.

FIG. 3B is a diagram showing configuration of the stator loss calculator according to Embodiment 1. The stator loss calculator 51 receives as input the inverter frequency finv and motor current effective value Imrms, and a fundamental primary copper loss calculator 511 calculates a fundamental primary copper loss Qsb based on the motor current effective value. Thereafter, based on the inverter frequency finv, a harmonic primary copper loss Qsh is calculated by a harmonic primary copper loss calculator 512, a stator fundamental iron loss Qssb is calculated by a stator fundamental iron loss calculator 513, a stator harmonic iron loss Qssh is calculated by a stator harmonic iron loss calculator 514, and each of these values is output to an adder 515. The adder 515 adds each of the losses and outputs the sum to the motor overload detector 6 as the stator loss QS.

Figure 3C:
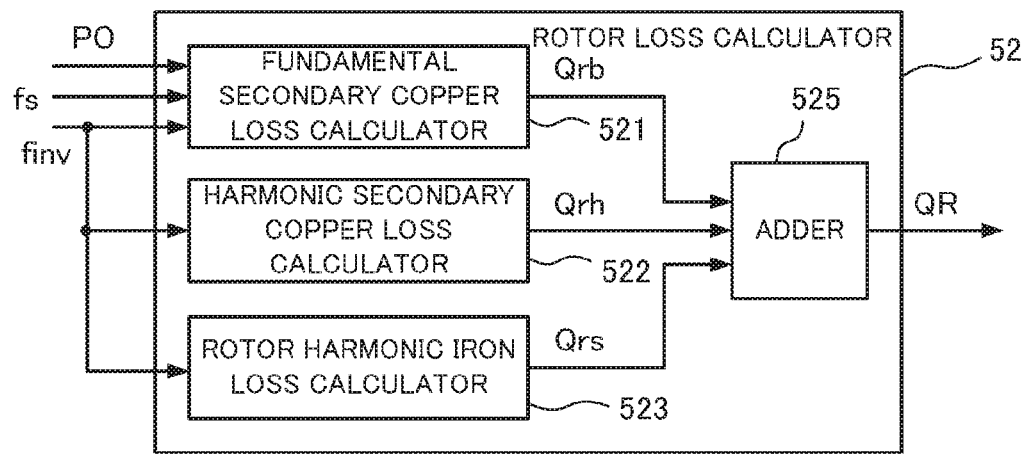
FIG. 3C is a diagram showing configuration of a rotor loss calculator according to Embodiment 1.

FIG. 3C is a diagram showing configuration of the rotor loss calculator of Embodiment 1. The rotor loss calculator 52 receives as input the motor output PO, slip frequency fs and inverter frequency finv, and uses a fundamental secondary copper loss calculator 521 to calculate a fundamental secondary copper loss Qrb. Moreover, based on the inverter frequency finv, a harmonic secondary copper loss calculator 522 calculates a harmonic secondary copper loss Qrh, rotor harmonic iron loss calculator 523 calculates a rotor harmonic iron loss Qrs, and these values are each output to an adder 525. The adder 525 adds each of the losses and outputs the sum to the motor overload detector 6 as the rotor loss QR. Each block of the loss calculations is described below.

Figure 4A:
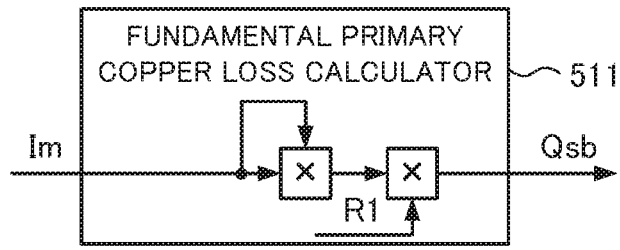
FIG. 4A is a diagram showing configuration of a fundamental primary copper loss calculator according to Embodiment 1.

FIG. 4A is a diagram showing configuration of the fundamental primary copper loss calculator according to Embodiment 1. The fundamental primary copper loss calculator 511 calculates the product of multiplication of a primary resistance R1 by the square of the motor current effective value Imrsm, and outputs the fundamental primary copper loss Qsb.

Figure 4B:
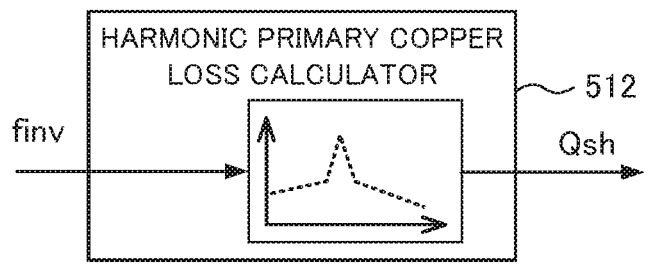
FIG. 4B is a diagram showing configuration of a harmonic primary copper loss calculator according to Embodiment 1.
Figure 4C:
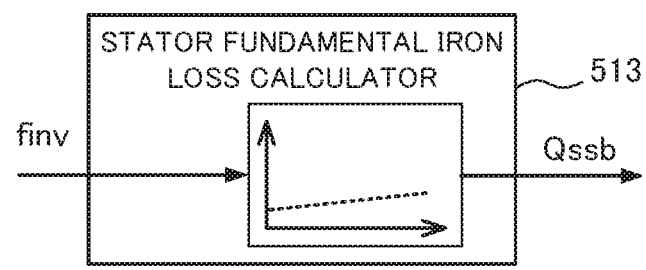
FIG. 4C is a diagram showing configuration of a stator fundamental iron loss calculator according to Embodiment 1.
Figure 4D:
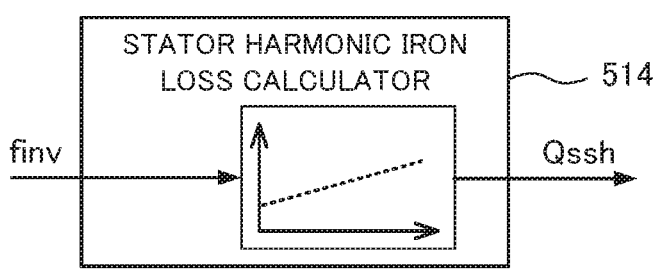
FIG. 4D is a diagram showing configuration of a stator harmonic iron loss calculator according to Embodiment 1.

FIG. 4B shows configuration of the harmonic primary copper loss calculator, FIG. 4C shows configuration of the stator fundamental iron loss calculator, and FIG. 4D shows configuration of the stator harmonic iron loss calculator. As described above, the harmonic primary copper loss Qsh, stator fundamental iron loss Qssb and stator harmonic iron loss Qssh depend on the inverter frequency finv, voltage command Vm and pulse mode PM. However, each of these losses, rather than changing according to the run command A like the motor current Im, can be taken to be previously known information, with the inverter frequency finv plotted along the horizontal axis. Thus each of the losses versus the inverter frequency finv can be defined by a loss table to calculate the harmonic primary copper loss Qsh, stator fundamental iron loss Qssb and stator harmonic iron loss Qssh according to the horizontally-plotted inverter frequency finv.

Figure 5A:
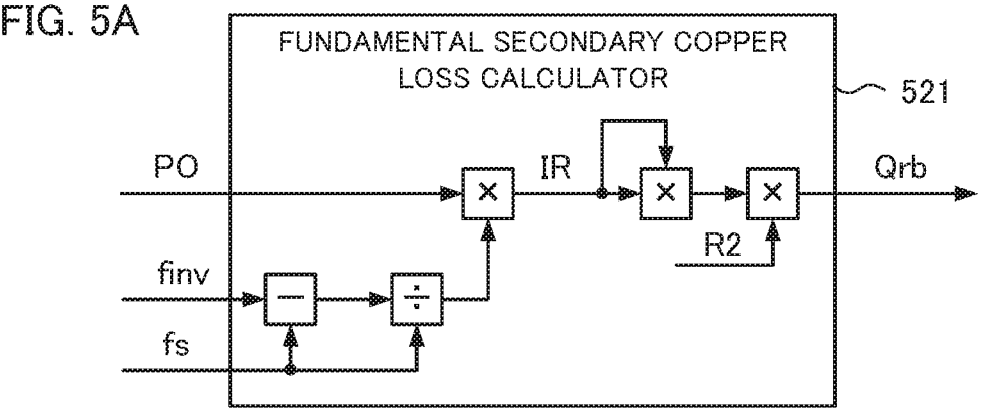
FIG. 5A is a diagram showing configuration of a fundamental secondary copper loss calculator according to Embodiment 1.

FIG. 5A is a diagram showing configuration of the fundamental secondary copper loss calculator according to Embodiment 1. Based on the inverter frequency finv and slip frequency fs, the fundamental secondary copper loss calculator 521 uses the motor output PO to calculate a rotor current IR. Then the fundamental secondary copper loss calculator 521 calculates a product of a secondary resistance R2 times the square of the rotor current IR, and outputs the result as the fundamental secondary copper loss Qrb.

Figure 5B:
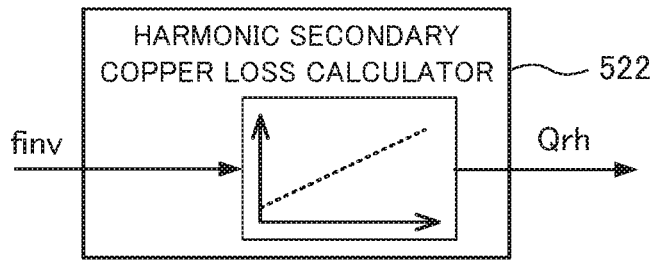
FIG. 5B is a diagram showing configuration of a harmonic secondary copper loss calculator according to Embodiment 1.
Figure 5C:
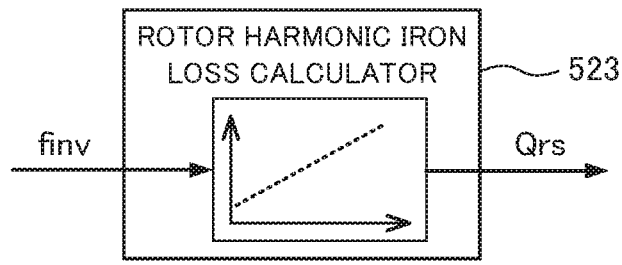
FIG. 5C is a diagram showing configuration of a rotor harmonic iron loss calculator according to Embodiment 1.

FIG. 5B shows configuration of the harmonic secondary copper loss calculator, and FIG. 5C shows configuration of the rotor harmonic iron loss calculator. The losses calculated by the harmonic secondary copper loss calculator 522 and rotor harmonic iron loss calculator 523, as described above, depend on the inverter frequency finv, voltage command Vm and pulse mode PM. However, unlike the motor current Im, these losses do not change due to the run command A, and each of these losses can be set as previously known information versus the horizontally-plotted inverter frequency finv. Thus each of the losses versus the inverter frequency finv can be defined by a loss table and can be output as the harmonic secondary copper loss Qrh and rotor harmonic iron loss Qrs according to the inverter frequency ay.

Figure 6:
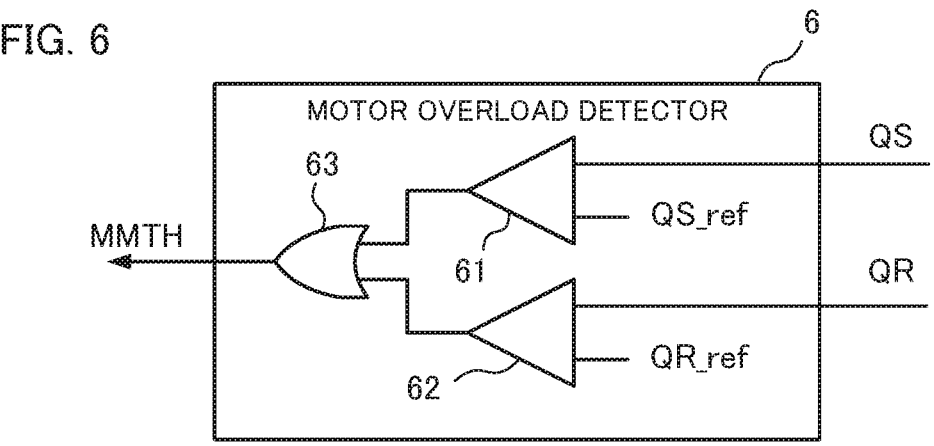
FIG. 6 is a diagram showing configuration of a motor overload detector according to Embodiment 1.

FIG. 6 is a diagram showing configuration of the motor overload detector according to Embodiment 1. The motor overload detector 6 uses a comparator 61 to compare the estimated stator loss QS, output from the motor loss estimator 5, to a stator overload detection setting signal QS_ref, and uses a comparator 62 to compare the estimated rotor loss QR to a rotor overload detection setting signal QR_ref. When the stator loss QS exceeds the stator overload detection setting signal QS_ref, or when the rotor loss QR exceeds the rotor overload detection setting signal QR_ref, a logical OR calculator 63 outputs a motor overload detection signal MMTH to the electric power conversion circuit controller 4. Via the switch 4e as shown in FIG. 2, the motor overload detection signal MMTH forbids operation of the main circuit operation command GS and turns OFF the switching elements Su to Sz of the inverter main circuit 2.

Furthermore, according to Embodiment 1, when the stator loss QS or the rotor loss QR exceeds their respective setting level, the motor overload detection signal MMTH is output, and operation of the inverter main circuit is stopped, thereby preventing motor burnout. Stopping of current to the electric motor 1 is not required for the stopping of motor burnout. For example, a configuration can be used in which the current flowing through the electric motor 1 is suppressed, or the run command A for determining size of the motor current is restricted.

According to the control device of Embodiment 1, as described above, the main circuit operation command (actual control value) for controlling the inverter is output based on the fundamental losses and harmonic losses included in each of the stator loss and rotor loss, and thus accuracy of electric motor over-temperature protection can be improved. Furthermore, not only an induction electric motor but also a synchronous electric motor is applicable to be used as the electric motor 1.

Embodiment 2

In Embodiment 2, a plurality of electric motors drive one load. For example, a plurality of electric motors may drive one assembly of electric vehicles. The inverter main circuit is provided for each of the electric motors. Based on the run command A, stator loss QS and rotor loss QR for each electric motor, the control device outputs the main circuit operation command GS for controlling the inverter main circuits of each of the electric motors. Furthermore, when any of the stator loss QS and the rotor loss QR of the electric motor exceed the respective detection setting signal level, at least part of a difference between the run command A for the electric motor and the output of the electric motor according to the main circuit operation command GS is added to an adjustment command value for addition to the run command for the electric motor for which the stator loss QS and the rotor loss QR do not exceed the detection setting signal levels. The main circuit operation command GS for controlling the inverter is output to the electric motor for which this adjustment command value was added, based on the adjustment command value, stator loss QS and rotor loss QR.

Figure 7:
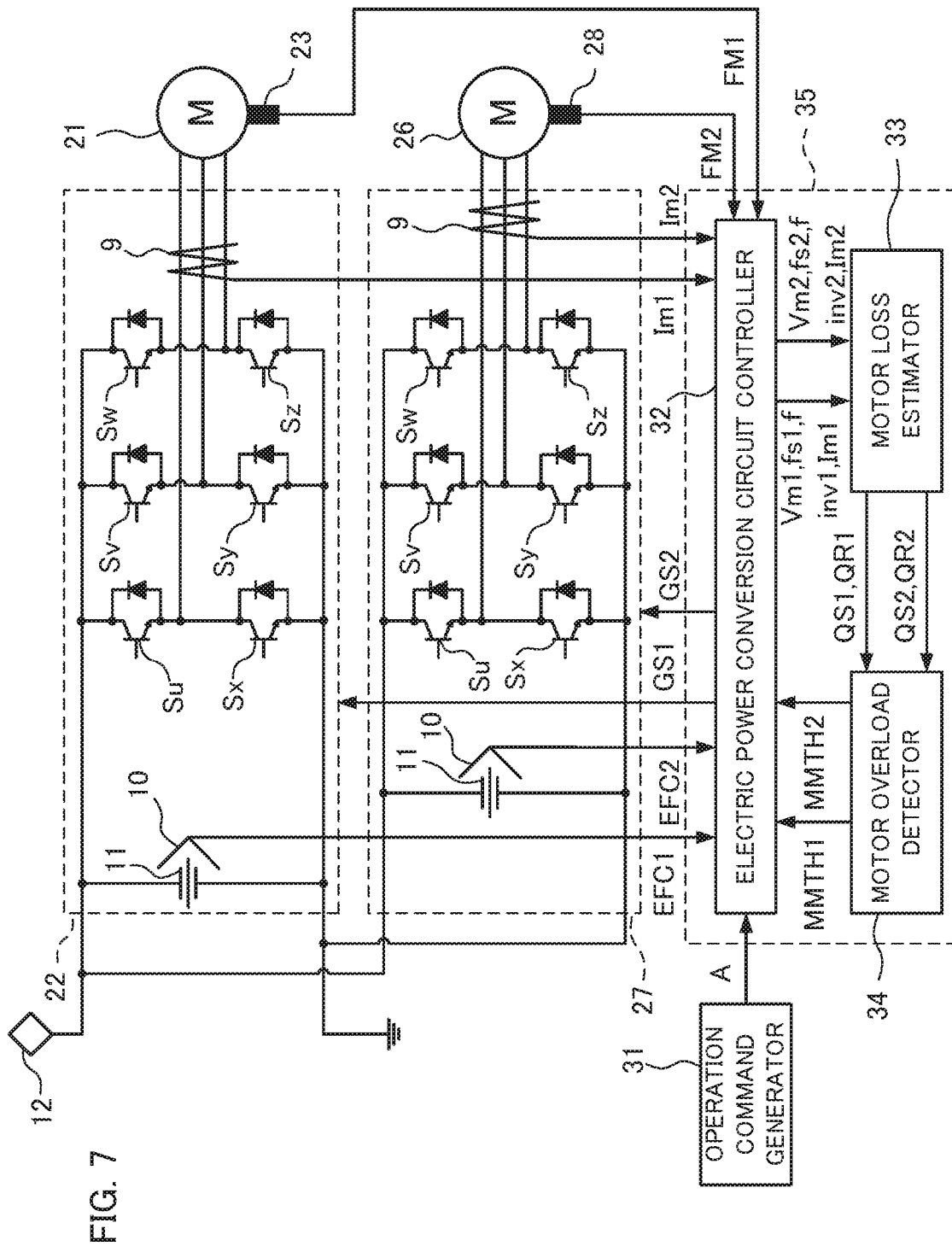
FIG. 7 is a diagram showing configuration of a control device according to Embodiment 2 of the present disclosure.

FIG. 7 is a diagram showing configuration of the control device according to Embodiment 2 of the present disclosure. In Embodiment 2, an example is described of a configuration using two electric motors 21 and 26. An inverter main circuit 22 is provided corresponding to an electric motor 21, and an inverter main circuit 27 is provided corresponding to an electric motor 26. Although the control device 35 has basically the same configuration as that of Embodiment 1, as described above, according to the resultant 2-group configuration of the inverter main circuits 22 and 27, the I/O signals between the control device 35 and the inverter main circuits 22 and 27 are for 2 groups.

The control device 35 receives as input the run command A from the operation command generator 31. Respective values for the run command A may be input for each of the electric motors 21 and 26, or alternatively, one value may be input, and then distributed by the control device 35 for each of the electric motors 21 and 26. The control device 35 acquires a motor current Im1 and a DC voltage EFC1 from the inverter main circuit 22, and acquires a motor current Im2 and a DC voltage EFC2 from the inverter main circuit 27. Moreover, a motor frequency FM1 is acquired from a rotation detector 23 attached to the electric motor 21, and a motor frequency FM2 is acquired from a rotation detector 28 attached to the electric motor 26. The control device 35, based on the DC voltage EFC1, run command A, motor current Im1 and motor frequency FM1 for the electric motor 21, calculates for the electric motor 21 a stator loss QS1 and a rotor loss QR1, each including the fundamental losses and harmonic losses, and based on the DC voltage EFC2, run command A, motor current Im2 and motor frequency FM2 for the electric motor 26, calculates for the electric motor 26 a stator loss QS2 and a rotor loss QR2, each including the fundamental losses and harmonic losses. Then based on the run command A, stator loss QS1 and rotor loss QR1, a main circuit operation command GS1 is output for controlling the inverter main circuit 22; and based on the run command A, stator loss QS2 and rotor loss QR2, a main circuit operation command GS2 is output for controlling the inverter main circuit 27.

Moreover, in the control device 35, 2 groups of signals are appended in a similar manner, losses of each of the electric motor 21 and electric motor 26 are calculated by the motor loss estimator 33, and the motor overload detector 34 generates a motor overload detection signal MMTH1 for the electric motor 21 and a motor overload detection signal MMTH2 for the electric motor 26.

The motor loss estimator 33 and the motor overload detector 34 are internally configured as motor loss estimators and motor overload detectors that are separately provided for the electric motors 21 and 26, and are identical to those of Embodiment 1, although internal logic is the same for the motor loss estimators and the motor overload detectors.

Figure 8:
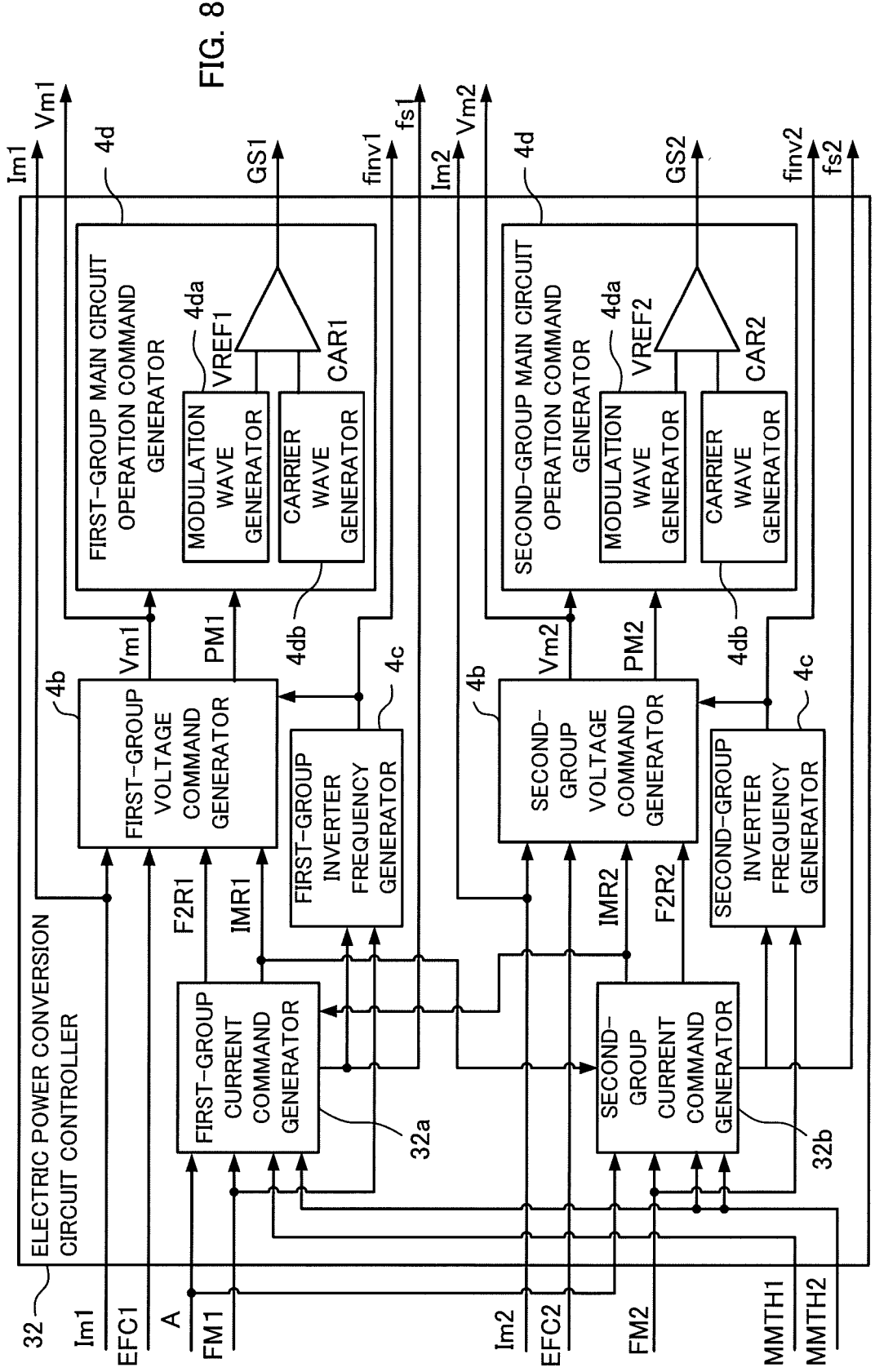
FIG. 8 is a block diagram showing an example configuration of an electric power conversion circuit controller according to Embodiment 2.

FIG. 8 is a block diagram showing an example configuration of the electric power conversion circuit controller according to Embodiment 2. In the electric power conversion circuit controller 32, the motor overload detection signal MMTH1 for the electric motor 21 generated by the motor overload detector 34 is received as input by a first-group current command generator 32a, and the motor overload detection signal MMTH2 for the electric motor 26 generated by the motor overload detector 34 is received as input by a second-group current command generator 32b. Moreover, the first-group electric current command IMR1 is input to the second-group current command generator 32b, and the second-group electric current command IMR2 is input to the first-group current command generator 32a, resulting in a configuration that enables the first group and the second group to monitor the motor control state of the other group.

Figure 9:
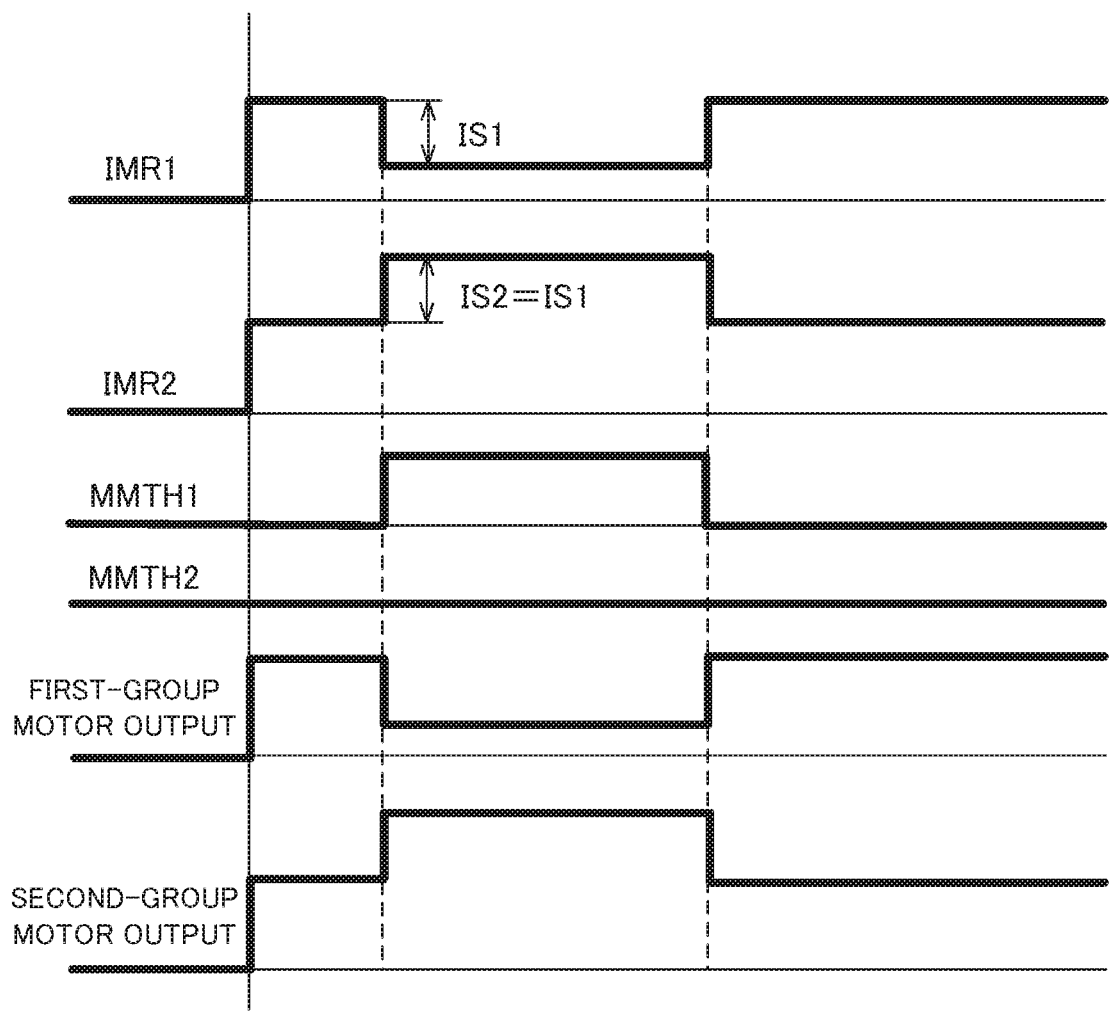
FIG. 9 is a diagram showing transitioning of electric current commands when first-group motor over-temperature sensing occurs according to Embodiment 2.

FIG. 9 is a diagram showing transitioning of electric current commands when first-group motor over-temperature sensing occurs according to Embodiment 2. According to Embodiment 1, a configuration is used such that, when motor overload is detected, the inverter main circuit is stopped, or current flowing through the electric motor is suppressed, or the run command A for determination of size of the current is restricted. In contrast, according to Embodiment 2 as shown in FIG. 9, for example when a motor overload is detected at the first-group side, the first-group electric current command is narrowed by a first-group current reduction IS1 within a range that avoids motor overload. For the second group, the second-group electric current command IMR2 is increased by a second-group current increase amount IS2 portion equivalent to the first-group current reduction IS1 after input of the first-group motor load MMTH1. In this manner, by configuration of the first-group current command generator 32a and the second-group current generator 32b, stability of running can be secured without loss of performance as one assembly of electric vehicles, for example, in which one load is driven by the electric motors 21 and 26.

Furthermore, the second-group increase amount IS2 is preferably less than or equal to the first-group reduction IS1, and of course, the second-group increase amount IS2 not being equal to the first-group reduction IS1 is permissible.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Electric motor
2 Inverter main circuit
3 Operation command generator
4 Electric power conversion circuit controller
4a Current command generator
4b Voltage command generator
4c Inverter frequency generator
4d Main circuit operation command generator
4e Switch
5 Motor loss estimator
6 Motor overload detector
7 Control device
8 Rotation detector
9 Current detector
10 Voltage detector
11 Filter capacitor
12 Pantograph
21 Electric motor
22 Inverter main circuit
23 Rotation detector
26 Electric motor
27 Inverter main circuit
28 Rotation detector
31 Operation command generator
32 Electric power conversion circuit controller
33 Motor loss estimator
34 Motor overload detector
35 Control device
50 Effective value calculator
51 Stator loss calculator
52 Rotor loss calculator
53 Motor output calculator
61, 62 Comparator
63 Logical OR calculator
511 Fundamental primary copper loss calculator
512 Harmonic primary copper loss calculator
513 Stator fundamental iron loss calculator
514 Stator harmonic iron loss calculator
521 Fundamental secondary copper loss calculator
522 Harmonic secondary copper loss calculator
523 Rotor harmonic iron loss calculator

The invention claimed is:

1. A control device to control an inverter for driving an electric motor, comprising:
an acquirer to acquire a DC voltage input to the inverter, an output voltage of the inverter, a motor amperage of a current flowing through the electric motor, and a motor frequency indicating a rotation rate of the electric motor;
a loss calculator to calculate a stator loss and a rotor loss including fundamental losses and harmonic losses of the electric motor, based on at least one of the DC voltage, the output voltage of the inverter, the motor amperage, and the motor frequency; and
a controller to output an actual control value for control of the inverter, based on the output voltage of the inverter, the stator loss and the rotor loss,
wherein
the loss calculator calculates:
the stator loss comprising a fundamental primary copper loss, a harmonic primary copper loss, a stator fundamental iron loss and a stator harmonic iron loss of the electric motor; and
the rotor loss comprising a fundamental secondary copper loss, a harmonic secondary copper loss and a stator harmonic iron loss of the electric motor.

2. The control device according to claim 1, wherein the controller is further to, when the stator loss or the rotor loss exceeds a detection setting signal level, output the actual control value to turn off a switching element of the inverter.

3. The control device according to claim 1, wherein the controller is further to, when the stator loss or the rotor loss exceeds a detection setting signal level, output the actual control value for:
suppressing the current flowing through the electric motor, or
restricting a run command for determining size of the electric current.

4. The control device according to claim 1, the controller being to further control the inverter for each of a plurality of inverters, each inverter being for driving the electric motor of a plurality of electric motors driving a single load, wherein
the acquirer is to further acquire the DC voltage input to each inverter, the output voltage of each inverter, the motor amperage of current flowing through each electric motor, and the motor frequency indicating the rotation rate of each electric motor;
the loss calculator is to further calculate the stator loss and rotor loss including the fundamental losses and harmonic losses of each electric motor, based on at least one of the DC voltage of each electric motor, the output voltage of each of the inverters, the motor amperage, and the motor frequencies of each electric motor; and when the stator loss or rotor loss exceeds a detection setting signal level for any of the electric motors, the controller is to perform:

calculating an adjustment command value by adding, to the output voltage of the inverter of a non-level-exceeding electric motor, in which the stator loss and rotor loss do not exceed the detection setting signal levels, at least part of a difference between the output voltage of the inverter corresponding to the level-exceeding electric motor and the actual control value calculated based on the output voltage, the stator loss and rotor loss corresponding to the level-exceeding electric motor, and based on the adjustment command value, stator loss and rotor loss of the non-level-exceeding electric motor, outputting the actual control value for controlling the inverter of the non-level-exceeding electric motor.

5. A control device to control an inverter for driving an electric motor, comprising:

an acquirer to acquire a DC voltage input to the inverter, an output voltage of the inverter, a motor amperage of a current flowing throuqh the electric motor, and a motor frequency indicating a rotation rate of the electric motor;

a loss calculator to calculate a stator loss and a rotor loss including fundamental losses and harmonic losses of the electric motor, based on at least one of the DC voltage, the output voltage of the inverter, the motor amperage, and the motor frequency; and a controller to output an actual control value for control of the inverter, based on the output voltage of the inverter, the stator loss and the rotor loss, wherein the loss calculator calculates:

a fundamental primary copper loss of the electric motor based on an effective value of the motor amperage of the current flowing through the electric motor;

a harmonic primary copper loss, a stator fundamental iron loss and a stator harmonic iron loss, based on the output voltage of the inverter and the motor frequency;

a fundamental secondary copper loss based on the DC voltage, the output voltage of the inverter, the motor amperage and the motor frequency; and a harmonic secondary copper loss and a rotor harmonic iron loss based on the output voltage of the inverter and the motor frequency.

* * * * *